United States Patent
Rajkumar et al.

(10) Patent No.: US 11,232,650 B2
(45) Date of Patent: Jan. 25, 2022

(54) MODELLING OPERATIONAL CONDITIONS TO PREDICT LIFE EXPECTANCY AND FAULTS OF VEHICLE COMPONENTS IN A FLEET

(71) Applicant: Conduent Business Services, LLC, Dallas, TX (US)

(72) Inventors: Arun Rajkumar, Velachery (IN); Sriranjani Ramakrishnan, TamiNadu (IN); Shisagnee Banerjee, Kolkata (IN); Rishabh Singh, Uttar Pradesh (IN); Kowshik Chilamkurthi, Karnataka (IN); Prateek Yadav, Rajasthan (IN); Narayanan Unny, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 438 days.

(21) Appl. No.: 16/131,632

(22) Filed: Sep. 14, 2018

(65) Prior Publication Data
US 2020/0090419 A1 Mar. 19, 2020

(51) Int. Cl.
*G07C 5/00* (2006.01)
*G06N 5/02* (2006.01)
(Continued)

(52) U.S. Cl.
CPC ......... *G07C 5/006* (2013.01); *G01C 21/3415* (2013.01); *G01C 21/3461* (2013.01); *G06N 5/02* (2013.01); *G07C 5/06* (2013.01)

(58) Field of Classification Search
CPC ........ G07C 5/006; G07C 5/06; G07C 5/0816; G01C 21/3461; G01C 21/3415;
(Continued)

(56) References Cited

U.S. PATENT DOCUMENTS

| | | | |
|---|---|---|---|
| 6,415,395 B1 | 7/2002 | Varma et al. | |
| 6,567,752 B2 | 5/2003 | Cusumano et al. | |
| 6,609,051 B2 | 8/2003 | Fiechter et al. | |
| 7,934,123 B2 | 4/2011 | Gross et al. | |

(Continued)

OTHER PUBLICATIONS

Baykal-Gürsoy, M. et al., "Modeling traffic flow interrupted by incidents." European J. of Operational Res. 195:127-138 (2009).
Du, N, et al. "Recurrent marked temporal point processes: Embedding event history to vector." In Proceedings of the 22nd ACM SIGKDD International Conference on Knowledge Discovery and Data Mining pp. 1555-1564 (Aug. 3, 2016).
(Continued)

*Primary Examiner* — Adam R Mott
(74) *Attorney, Agent, or Firm* — Jones Robb, PLLC

(57) ABSTRACT

Systems, methods, and processing nodes determine and perform preventive maintenance on a transport vehicle in a transportation system. The method includes extracting features for previous incidents that have occurred to a plurality of transport vehicles in the transportation system. The method also includes determining a criticality of types of incidents based on the features extracted. The method includes predicting, based on the criticality of types of incidents and the features extracted, details of at least one future incident for a first transport vehicle from the plurality of transport vehicles. The details include a predicted type of the at least one future incident, a predicted time of the at least one future incident, and a predicted criticality of the at least one future incident. Additionally, the method includes performing a prescriptive action for the first transport vehicle to mitigate the at least one future incident in the first transport vehicle.

19 Claims, 17 Drawing Sheets

(51) Int. Cl.
*G01C 21/34* (2006.01)
*G07C 5/06* (2006.01)

(58) Field of Classification Search
CPC .... G06N 5/02; B60W 50/02; B60W 50/0205;
B60W 2050/021; B60W 2050/0215;
B60W 2050/022; B60W 50/0225; B60W
50/023; B60W 50/029; B60W 2050/0292;
B60W 2050/0295; B60W 2050/0297;
B60W 50/032; B60W 50/035; B60W
50/038
See application file for complete search history.

(56) References Cited

U.S. PATENT DOCUMENTS

| | | | |
|---|---|---|---|
| 8,712,726 B2 | 4/2014 | Li et al. | |
| 8,825,414 B2 | 9/2014 | Garvey et al. | |
| 2008/0126040 A1* | 5/2008 | Franklin | G05B 17/02 703/7 |
| 2009/0254240 A1* | 10/2009 | Olsen, III | G06Q 10/06 701/29.5 |
| 2011/0054806 A1 | 3/2011 | Goldfine et al. | |
| 2011/0172874 A1 | 7/2011 | Patnaik et al. | |
| 2018/0114377 A1* | 4/2018 | Dyeyev | G07C 5/0808 |
| 2018/0141565 A1* | 5/2018 | Petrak | G07C 5/0816 |
| 2019/0066407 A1* | 2/2019 | Kwak | G06Q 50/30 |
| 2019/0213803 A1* | 7/2019 | Ye | G06Q 10/20 |
| 2019/0260204 A1* | 8/2019 | Koval | G06N 3/0445 |
| 2019/0287005 A1* | 9/2019 | Subramaniyan | G06N 5/04 |

OTHER PUBLICATIONS

Lindley, J.A. "Urban Freeway Congestion: Quantification of the Problem and Effectiveness of Potential Solutions." ITE Journal 57:27-32 (1987).

Medjaher et al. "Remaining useful life estimation of critical components with application to bearings." IEEE Transactions on Reliability 61:2:292-302 (2012).

Nam, D. and F. Mannering. "An Exploratory Hazard- Based Analysis of Highway Incident Duration." Transportation Research A 34:85-102 (2000).

Si, Xiao-Sheng, et al. "Remaining useful life estimation based on a nonlinear diffusion degradation process." IEEE Transactions on Reliability 61:1:50-67 (2012).

Si, Xiao-Sheng, et al. "Remaining useful life estimation—a review on the statistical data driven approaches." European J. of Operational Res. 213:1:1-14 (2013).

Sikorska, J. Z., et al., "Prognostic modelling options for remaining useful life estimation by industry." Mechanical Systems and Signal Processing 25.5:1803-1836 (2011).

Skabardonis, A., et al., "Measuring recurrent and nonrecurrent traffic congestion." Transportation Research Record: Journal of the Transportation Research Board 1856, 118-124 (2003).

Wang W., et al., "A Study of Characteristics of Motorway Vehicle Breakdown Duration." 11th IEE International Conference on Road Transport Information and Control. London, England: IEE Press. (2002).

Wang W, et al., "Vehicle breakdown duration modeling". Journal of Transportation and Statistics. 8:1:75-84 (2005).

* cited by examiner

Table 2
Replacement Sheet n = 821, number of events = 579

| | coef | exp(coef) | se(coef) | z | p | lower 0.95 | upper 0.95 | |
|---|---|---|---|---|---|---|---|---|
| Elevation_kurtosis | 4.522e-01 | 1.572e+00 | 4.005e-01 | 1.129e+00 | 2.589e-01 | -3.329e-01 | 1.237e+00 | |
| Elevation_mean | 5.320e-02 | 1.055e+00 | 1.112e-01 | 4.786e-01 | 6.322e-01 | -1.647e-01 | 2.711e-01 | |
| Elevation_skew | 1.067e+00 | 2.906e+00 | 4.476e-01 | 2.384e+00 | 1.715e-02 | 1.894e-01 | 1.944e+00 | * |
| Elevation_std | 2.497e-01 | 1.284e+00 | 1.957e-01 | 1.276e+00 | 2.019e-01 | -1.339e-01 | 6.333e-01 | |
| No_of_bus_stops | -1.576e+00 | 2.068e-01 | 1.263e-01 | -1.248e+01 | 9.138e-36 | -1.824e+00 | -1.329e+00 | *** |
| No_of_turns | -4.646e-01 | 6.284e-01 | 7.455e-02 | -6.233e+00 | 4.585e-10 | -6.108e-01 | -3.185e-01 | *** |
| Total_load | -1.365e-01 | 8.724e-01 | 6.352e-02 | -2.150e+00 | 3.158e-02 | -2.611e-01 | -1.202e-02 | * |
| precipitation_mm | 8.664e-02 | 1.091e+00 | 1.388e-01 | 6.240e-01 | 5.326e-01 | -1.855e-01 | 3.588e-01 | |
| snow_depth_cm | 2.659e-03 | 1.003e+00 | 1.482e-01 | 1.794e-02 | 9.857e-01 | -2.879e-01 | 2.932e-01 | |
| temperature_avg_C | 3.081e-01 | 1.361e+00 | 1.784e-01 | 1.727e+00 | 8.417e-02 | -4.164e-02 | 6.578e-01 | . |

Signif. codes: 0 '*' 0.001 '' 0.01 '*' 0.05 '.' 0.1 ' ' 1

Concordance = 0.851

FIG. 4H

Incident Analysis

◀ BACK    [Incident Type ⌄]    Date Range [📅 August 19, 2017 - August 25, 2017 ▼]

Overview  Distribution  Prediction

🔍  ⋎  🌐  ↵

| Incident ID ↓ | Incident Type | Description | Date ↓ | Time ↓ | Operator ID | Route ID | Block ID | Vehicle ID |
|---|---|---|---|---|---|---|---|---|
| 1124955961 | Electronic | Luggage door stuck | 7 Aug | 7:30 am | 2846 | 13 | 54 | 119 |
| 1126490509 | Engine | Clunk under the bus heard | 7 Aug | 7:50 am | 1174 | 48 | 67 | 366 |
| 1130128625 | Engine | Transmission leak | 8 Aug | 9:00 am | 1735 | 33 | 73 | 330 |
| 242841848 | Unknown | Bus keeps stalling out | 8 Aug | 9:42 am | 2488 | 13 | 76 | 320 |
| 1131766385 | Other | LL dispatch called at 18:55 | 10 Aug | 10:33 am | 3650 | 7 | 101 | 322 |
| 1133378691 | Electronic | Brake Lights stay on | 12 Aug | 12:15 pm | 2099 | 45 | 33 | 431 |
| 1134491807 | Climate | Flat Tyre | 12 Aug | 1:48 pm | 1072 | 16 | 47 | 627 |
| 1124955961 | Electronic | Luggage door stuck | 12 Aug | 7:30 pm | 2846 | 13 | 05 | 342 |
| 1126490509 | Engine | Clunk under the bus heard | 12 Aug | 7:50 pm | 1174 | 48 | 12 | 320 |
| 1130128625 | Engine | Transmission leak | 13 Aug | 9:00 am | 1735 | 33 | 26 | 322 |
| 242841848 | Unknown | Bus keeps stalling out | 13 Aug | 9:42 am | 1309 | 13 | 08 | 365 |

FIG. 6B

MODELLING OPERATIONAL CONDITIONS TO PREDICT LIFE EXPECTANCY AND FAULTS OF VEHICLE COMPONENTS IN A FLEET

TECHNICAL BACKGROUND

Knowledge of remaining useful life times (RUL) of components on transport vehicles, such as tires on buses, can be useful to transportation systems, such as public transportation systems or vehicle fleets, to reduce their operational cost. For instance, knowledge of the RUL of components can assist in planning preventive maintenance schedules, which can in turn lead to improved component lifetimes and reduced cost. Currently, sensors may be installed on components to provide physical data about the condition of the components. For instance, for tires, the knowledge of tread depth is useful to predict remaining useful life. It, however, is often infeasible to install sensors that provide this key data from components to predict useful life and, in practice, this data is often unavailable.

Further, transportation systems are often faced with the prospect of responding to unforeseen incidents occurring to the transport vehicles in the fleets of the transportations systems. These incidents may include accidents, vehicle breakdowns, spilled loads, or any other random events that reduce the capacity of the fleet leading to financial loss to the transportation system and customer dissatisfaction due to inferior service levels provided by the transportation system. As such, it is useful to the transportation system to have an indication that these incidents may occur in the near future. But, some incidents such as accidents and vehicle breakdown due to unknown causes are difficult to predict.

OVERVIEW

Exemplary embodiments described herein include systems, methods, and processing nodes for performing preventive maintenance on a transport vehicle in a transportation system. An exemplary method for performing preventive maintenance on a transport vehicle in a transportation system includes extracting features for previous incidents that have occurred to a plurality of transport vehicles in the transportation system. The method also includes determining a criticality of types of incidents based on the features extracted. Further, the method includes predicting, based on the criticality of types of incidents and the features extracted, details of at least one future incident for a first transport vehicle from the plurality of transport vehicles. The details include a predicted type of the at least one future incident, a predicted time of the at least one future incident, and a predicted criticality of the at least one future incident. Additionally, the method includes performing a prescriptive action for the first transport vehicle to mitigate the at least one future incident in the first transport vehicle.

Exemplary embodiments also described herein include systems, methods, and processing nodes for extending usage of components of a transport vehicle in a transportation system. An exemplary method for performing preventive maintenance on a transport vehicle in a transportation system includes extracting features for components of a plurality of components of transport vehicles in the transportation system, the features comprising operating conditions of the components. The method also includes selecting a first component from the plurality of components for prediction of remaining useful life of the first component. Further, the method includes determining the remaining useful life of the first component. The remaining useful life is determined by applying the features to a survival analysis model. Additionally, the method includes performing a prescriptive action to extend the remaining useful life of the first component.

An exemplary system for extending usage of components of a transport vehicle in a transportation system includes a processing node and a processor coupled to the processing node. The processor configures the processing node to perform operations including extracting features for components of a plurality of components of transport vehicles in the transportation system, the features comprising operating conditions of the components. The method also includes selecting a first component from the plurality of components for prediction of remaining useful life of the first component. Further, the method includes determining the remaining useful life of the first component. The remaining useful life is determined by applying the features to a survival analysis model. Additionally, the method includes performing a prescriptive action to extend the remaining useful life of the first component.

BRIEF DESCRIPTION OF THE DRAWINGS

FIG. 4H depicts a table containing source data used to obtain the experimental test results shown in FIGS. 4A-4G.

FIGS. 6A-6D depict an example of experimental test results for the method of predicting incidents for a transport vehicle, according to various embodiments of the present disclosure.

DETAILED DESCRIPTION

Figure 1A:
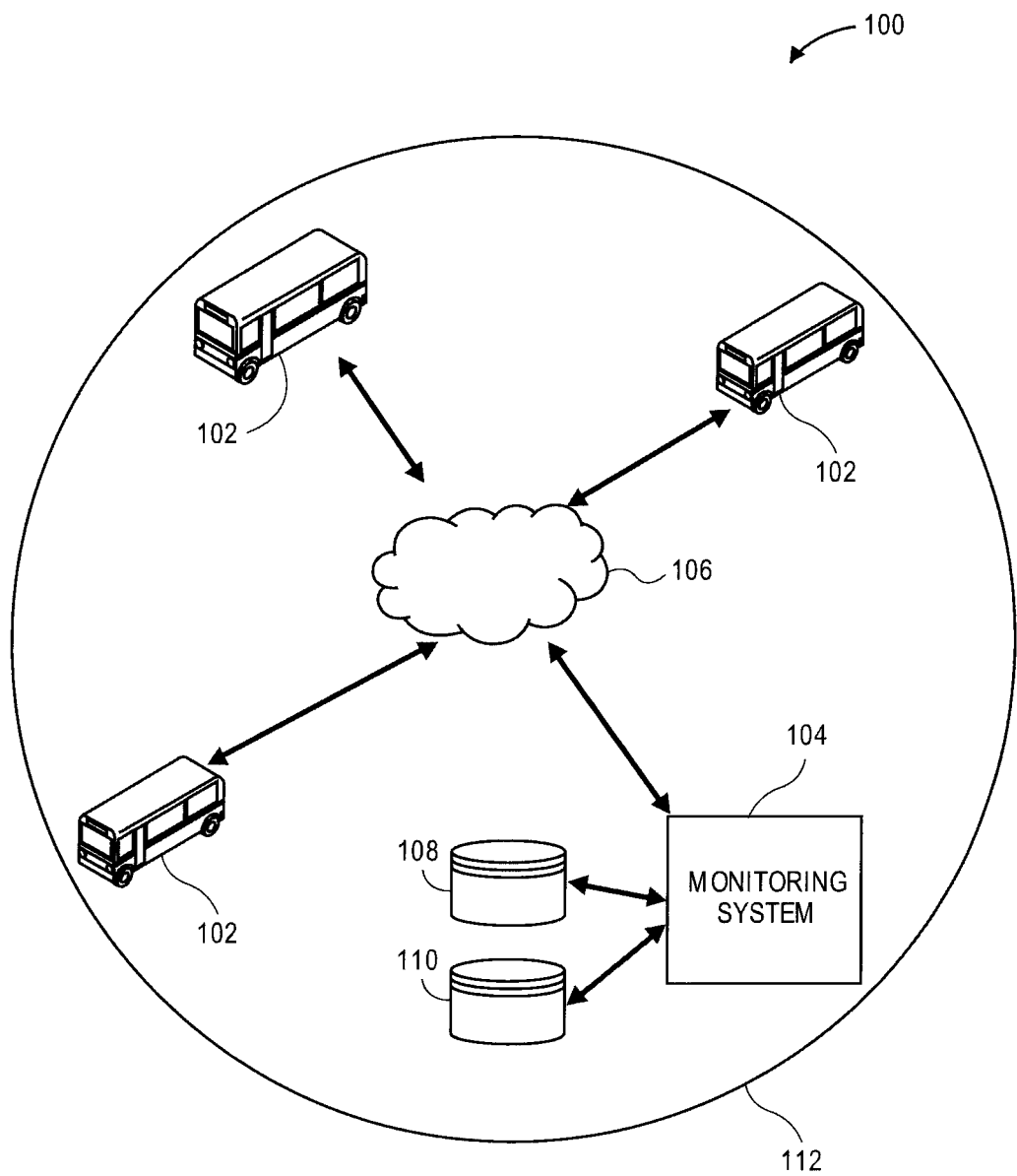
FIG. 1A depicts an example of a transportation system, according to various embodiments of the present disclosure.

According to embodiment of the present disclosure, a system and method is provided for predicting faults and incidents in a transportation system. In embodiments, the system and method for predicting faults provides a model of life expectancy of a component for a fleet of vehicles, which can then be used to prescribe actions to increase the life. The system and method directly utilize the operating conditions to module RUL of components of a transport vehicle, such as elevation profile of the road in which the tire travelled, the weather conditions, etc. to model the RUL of tires. The system and method utilize survival analysis algorithms, such as COX Proportional Hazzard (Cox-PH) regression and various regularized variants of the same, to model the RUL based on operating conditions. In addition to predicting remaining useful time of tires, the system and method can utilize the prediction to schedule the use of the components and schedule preventive maintenance, such as establish prescriptions as to which bus to install a tire on so that the remaining useful time would be maximized. Additionally, when there are multiple components and multiple operational conditions present, the system and method can match these optimally under any other practical constraints.

The system and method also predicts incidents that involve faults occurring to transport vehicles in the transportation system. In addition to predicting the number of faults within the fleet, the system and method also provides a forecast of the criticality and the duration of a fault. The "duration" of a fault being defined as the time interval between the neighboring successive faults occurring to the transport vehicle. The system and method includes two processes to predict different facets of fault prediction. One process uses features like data from vehicles, road geometrics, weather, historical data about faults etc. to develop a statistical model for the fault along with its criticality. The criticality defines the risk of a fault in a transport vehicle developing into a major incident for the vehicle resulting in a breakdown of the transport vehicle. The second process uses deep neural networks to predict fault duration and its type.

The system and method predicting faults and incidents in a transportation system overcomes a problem of lack of physical condition data for components by using data available from both proprietary databases and public databases as a proxy to model RUL. The system and method can also help prescribe best operating conditions for components and also help plan assignment of components to operating conditions under practical constraints so that costs are optimized. Moreover, while preventive maintenance scheduling and component assignment have been previously done in an ad-hoc manner in transportation systems, the system and method allows the preventive maintenance scheduling and component assignment to be performed in a principled manner which can help in optimizing cost. Moreover, by predicting faults and incidents, the vehicle maintenance system's intelligence and reduce cost for maintenance can be improved.

Also, if a system can provide information about the RUL of a component, e.g., a bus tire, under different operating conditions, e.g., future routes, as opposed to current operating conditions, the RUL can be used to answer prescriptive analytics questions such as: which is the best operating condition to increase the life time of a particular component; and given multiple components and multiple operating conditions, what is the best way to allocate components to operating conditions to optimize cost under any other practical constraints.

These and additional operations are further described with respect to the embodiments depicted in FIGS. 1A-1C, 2, 3A, 3B, 4A-4G, FIG. 5, FIGS. 6A-6D, and FIG. 7 below.

FIG. 1 illustrates an example of a transportation system 100, according to embodiments of the present disclosure. While the transportation system 100 illustrates various components, one skilled in the art will realize that additional components can be added and existing components can be removed.

As illustrated in FIG. 1, the transportation system 100 includes one or more transport vehicles 102, e.g., buses. The transportation system 100 can represent any type of transportation system that operates a fleet of transport vehicles 102 within a geographic area 112. While FIG. 1 illustrates the transport vehicles 102 as buses, one skilled in the art will realize that the transport vehicles 102 can be any type of transport vehicles such as trains, cars, trams, etc.

The transportation system 100 also includes a monitoring system 104 that can communicate with the transport vehicles via a network 106. The monitoring system 104 communicates with one or more databases, e.g., an open database 108 and a proprietary database 110. The open database 108 and the proprietary database 110 can store data about the operating conditions of the transportation system 100 and the transport vehicle 102 and physical conditions of the components of the transport vehicles 102. The open databases 108 can include public sources of information about the operating condition in the geographical area serviced by the transportation system 100, such as current and historical weather conditions, geographical terrain, road conditions, etc. The proprietary database 110 can include private sources of information about the operations of the transportation system 100, such as routes of the transport vehicles 102, components installed on the transport vehicles 102, physical condition of the components installed on the transport vehicles 102, etc.

In embodiment, the monitoring system 104 is configured to predict faults and incidents in the transportation system 100. The monitoring system 104 is configured to store and utilize a model of life expectancy of one or more components of the transport vehicles 102, which can then be used to prescribe actions to increase the life of the component and the transport vehicles 102. For example, the monitoring system 104 can model RUL in order to schedule maintenance on the components, select placement of the components on the transport vehicles 102, determine the route of the transport vehicles 102, etc.

In embodiments, the monitoring system 104 directly utilize the operating conditions to module RUL of components of the transport vehicle 102. The operating conditions can include data, such as elevation profile of the road in which the tire traveled, the weather conditions, etc. The monitoring system 104 is configured to utilize survival analysis algorithms, such as Cox-PH regression and various regularized variants of the same, to model the RUL based on operating conditions. The monitoring system 104 is also configured to utilize the physical conditions of the components when available.

In addition to predicting RUL of components, the monitoring system 104 is configured to utilize the predicted RUL to schedule the use of the components and schedule preventive maintenance, such as assignment of components to a particular transport vehicle 102 so that the RUL would be maximized. Additionally, when there are multiple components and multiple operating conditions present, the monitoring system 104 is configured optimally match the components on the transport vehicles 102 subject to any other practical constraints.

The monitoring system 104 is also configured to predict incidents that involve faults occurring to the transport vehicles 102 in the transportation system 100. In addition to predicting the number of faults within the fleet of the transport vehicles 102, the monitoring system 104 is configured to provide a forecast of a criticality and a duration of a fault. The "duration" of a fault can be defined as a time interval between the neighboring successive faults occurring to a transport vehicle 102. The monitoring system 104 is configured to utilize two processes to predict different facets of fault and incidents. The monitoring system 104 is configured to utilize a process, which extracts and utilizes features such as data from vehicles, road geometrics, weather, historical data about faults etc. to develop a statistical model for the fault along with its criticality. The criticality can define the risk of a fault in a transport vehicle 102 developing into a major incident for the transport vehicle 102 resulting in a breakdown of the transport vehicle. The monitoring system 104 is configured to also utilize a second process that uses deep neural networks to predict fault duration and its type.

Figure 1B:
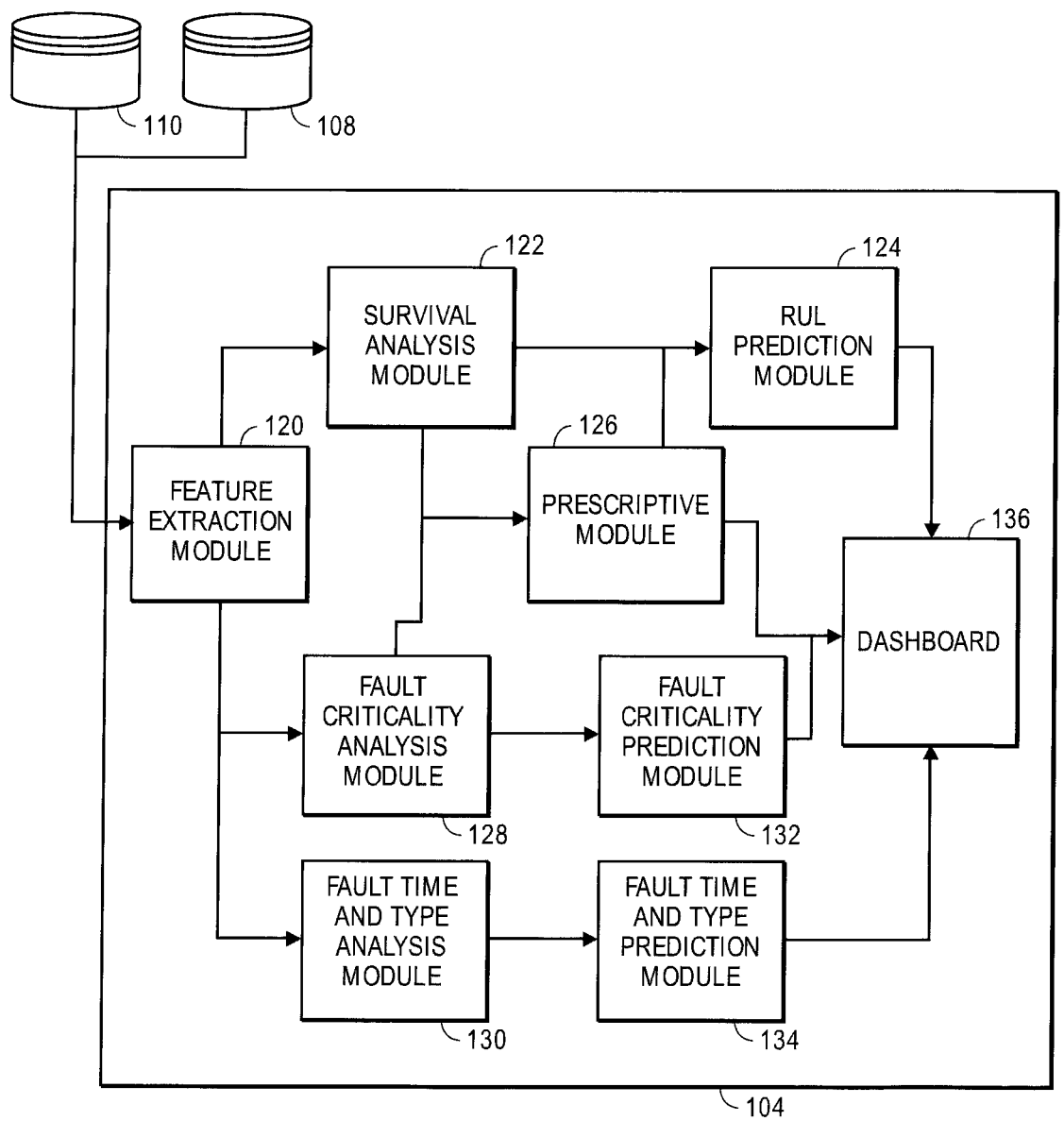
FIG. 1B depicts an example of a monitoring system, according to various embodiments of the present disclosure.

FIG. 1B illustrates a diagram of an example of the monitoring system 104. As illustrated, the monitoring system 104 includes a feature extraction module 120, a survival analysis module 122, a RUL prediction module 124, a prescriptive module 126, a fault criticality analysis module 128, a fault time and type analysis module 130, a fault criticality prediction module 132, a fault time and type prediction module 134, and a dashboard module 136.

The feature extraction module 120 is configured to extract to extract operating features of the transport vehicles 102 and the components of the transport vehicles 102 (e.g., number of days traveled, elevation of roads traveled in, average temperature, precipitation, etc.) from both the open database 108 and the proprietary database 110. Additionally, if available, the feature extraction module 120 can extract physical condition features (e.g., tread depth of tires, number of hours of usage of an engine, etc.) collected by sensors and diagnostic system of the transport vehicles 102.

For example, for the case of tires, the proprietary database 110 of the transportation system 100 includes details such as the transport vehicles 102 on which the tire was on every day, the route traveled by the transport vehicles 102, the number of bus stops the transport vehicles 102 stopped at, the number of passengers (load) carried by the transport vehicles 102, etc. The open database 108 can store data to complement the data the proprietary database 110, for example, weather conditions of the region serviced by the transportation system 100 including temperature, precipitation levels, etc., terrain data of the region serviced by the transportation system 100, road conditions serviced by the transportation system 100. The feature extraction module 120 can calculate additional operating data from the open database 108 and the proprietary database 110 for example, by computing elevation profile of routes in which a transport vehicle 102 (and hence the associated components) traveled every day, the weather conditions including temperature, precipitation levels, etc. Optionally, to predict RUL of transport vehicles 102, the feature extraction module 120 can also extract physical features of the components such as tread depth of the tire which would have a direct correlation with the RUL, if available.

The survival analysis module 122 is configured to use the features extracted to perform survival analysis. The survival analysis module 122 is configured to use both standard models such as Cox-PH model and extensions of the Cox-PH models. The survival analysis techniques can utilize data that can be censored, which means for example that some tires are still in use (and hence their observations have been censored until a specific date) while other tires have expired and are awaiting disposition. In addition to the standard COX-PH model for survival analysis, the survival analysis module 122 can utilize a suite of other algorithms which are regularized version of the COX-PH algorithm where the nature of regularization differs. These include regularization with L1 penalty, L2 penalty, L1+L2 penalty, OWL penalty, etc. Each of these penalties (regularization terms) induce a certain structure to the parameters of the model learned and hence are useful for different types of data.

In the Cox-PH algorithm, the survival analysis approach is that the hazard for one individual is proportional to the hazard for any other individual, where the proportionality constant is independent of time. The Cox-PH model says that the hazard at any time t is the product of two quantities—a time dependent baseline hazard function $h_o(t)$ and a time independent exponential of linear sum of explanatory variables:

$$h(t,X)=h_o(t)*e^{\Sigma_{j=1}^{p}\beta_j X_j} \qquad (1)$$

wherein, $h(t, X)$ represents the hazard associated with the p-dimensional feature vector X. It is a semi-parametric model in the sense that the baseline hazard function $h_o(t)$ is unspecified or rather learned from the data itself. The model is robust and the obtained results closely approximate the results from the correct parametric model. The exponential part in the hazard function ensures that the estimated hazards are always non-negative. Also, the effect of explanatory variables is assessed by the regression coefficients β's, and these are estimated without having information about the time-dependent part of the hazard function. These are usually obtained by the Maximum Likelihood (ML) estimation. The estimates of the parameters are derived by maximizing a likelihood function. This likelihood function describes the joint probability of obtaining the data actually observed on the subjects in the study as a function of the unknown parameters in the model being considered. The function only considers probabilities for those subjects who are censored, hence called as partial likelihood function.

The RUL prediction module 124 is configured to use the survival analysis module's output to predict the RUL of a component. Once the model has been built and trained (i.e. parameters learned) in the survival analysis module 122, the RUL prediction module 124 uses the built model to predict the RUL of components of the transport vehicles 102, e.g., tires, which are still in use. For instance, in the COX-PH model, the RUL prediction module 124 can compute the survival functions using the learned parameters.

The prescriptive module 126 is configured to use various operating characteristics for components of the transport vehicles 102 to prescribe optimal or desired conditions for the components to operate in. The prescriptive module 126 uses the built model in the survival analysis module 122 to do prescriptive analysis for the transportation system 100. For example, the prescriptive module 126 uses the model to predict which route will lead to the best remaining useful lifetime of a component of a transport vehicle 102, e.g., tire. For instance, given a route, the prescriptive module 126 can compute prototypical features corresponding to this route (e.g., elevation profile, average weather conditions, average number of turns, average passenger load etc.) and then use this as input to the RUL prediction module 124 to predict the RUL. The prescriptive module 126 can repeat this process for every route and the route with the maximum RUL which is prescribed, for example, by a user or predetermined.

The fault criticality analysis module 128 can be configured to determine a criticality of different faults, which can occur to the transport vehicles 102. The results can be fed to the prescriptive module 126 and the fault criticality prediction module 132. The fault criticality can be classified into low, medium or high based on the tolerable limit of the transport vehicle 102 leading to breakdown. To perform this, the factors affecting incidents like vehicle specific factors, external factors, road geometric factors, weather conditions etc. can be extracted from the open database 108 and the propriety database 110. The vehicle breakdown data for each transport vehicle 102 and route can be aggregate to a week level. Thus, prediction can be performed for the next week's data using the historical data for that transport vehicle 102.

The fault criticality analysis module 128 can utilize involves two processes: feature extraction and classification. For example, the fault criticality analysis module 128 can extract features as illustrated in Table 1:

TABLE 1

| Miles travelled | Active/Red time of the vehicle | Vehicle speed | Vehicle capacity |
|---|---|---|---|
| Age of the vehicle | Maximum load | No of stops | Number of incidents |
| Precipitation | Snow | Temperature | Total Power |
| Total Grade | Maximum power | Maximum Grade | No of issues with criticality maximum, medium, minimum |

These features cover the vehicle movements, vehicle load, weather information, elevation profile of the road, vehicle repair data, and past fault log data. The fault criticality analysis module 128 can preprocess the extracted features and classify the extracted features. The fault criticality analysis module 128 can utilize classical and state-of-the-art machine learning techniques like logistic regression, support vector machine, random forest, Gradient boosting, Adaboost for the fault criticality analysis.

Based on the criticality of a predicted fault, the prescriptive module 126 is configured to determine a prescription to mitigate the predicted fault. For example, a user can be notified of the predicted fault and the criticality of the fault. Additionally, additional transport vehicles 102 can be help in backup and maintenance can be performed.

The fault time and type analysis module 130 is configured to extract data to predict fault criticality, time, and type using the fault criticality prediction module 132 and the fault time and type prediction module 134. The fault time and type analysis module 130 can utilize a marked temporal point process, which is mathematical tool to model the latent mechanisms governing the observed random event patterns along time. Since the occurrence of an event may be triggered by what happened in the past, specify models for the timing of the next event given what we have already known can be determined.

Given the history of past events, the conditional density function that the next event will happen at time t with type y as f*(t, y)=f(t, y| $\mathcal{H}_t$|) where f*(t, y) emphasizes that this density is conditional on the history $\mathcal{H}_t$. To characterize temporal point process via the stochastic model for the next event time given all previous events. Within a small window [t, t+dt), λ*(t)dt is the probability for the occurrence of a new event given the history $\mathcal{H}_t$. It is defined as λ(t)dt= $\mathbb{P}$ {event in [t, t+dt)| $\mathcal{H}_t$}.

The * notation indicates that the function depends on the history. The conditional density function can be alternatively specified by $$f^*(t) = \lambda^*(t)\exp\left(-\int_{t_n}^{t}\lambda^*(\tau)d\tau\right).$$

To handle deciding which parametric form to use without prior knowledge, a unified model capable of modeling a general nonlinear dependency over the history of both the event timing and the marker information is proposed. The fault time and type prediction module 134 can utilize a recurrent neural networks (RNN) to model the nonlinear dependency over both of the markers and the timings from past events. For the event occurring at the time $t_j$ of type $y_j$, the pair $(t_j, y_j)$ is fed as the input into a recurrent neural network unfolded up to the $(j+1)^{th}$ event.

The embedding $h_{j-1}$ represents the memory of the influence from the timings and the markers of past events. The neural network updates $h_{j-1}$ to $h_j$ by taking into account the effect of the current event $(t_j, y_j)$. Since now $h_j$ represents the influence of the history up to the $j^{th}$ event, the conditional density for the next event timing can be naturally represented as $$f^*(t_{j+1}) = f(t_{j+1} | \mathcal{H}_t) = f(t_{j+1} | h_j) = f(d_{j+1} | h_j)$$

where $d_{j+1}=t_{j+1}-t_j$. As a consequence, we can depend on $h_j$ to make predictions to the timing $\hat{t}_{j+1}$ and the type $\hat{y}_{j+1}$ of the next event. The advantage of this formulation is that we explicitly embed the event history into a latent vector space, and by the elegant relation (4), we are now able to capture a general form of the conditional intensity function without the need of specifying a fixed parametric specification for the dependency structure over the history.

Figure 1C:
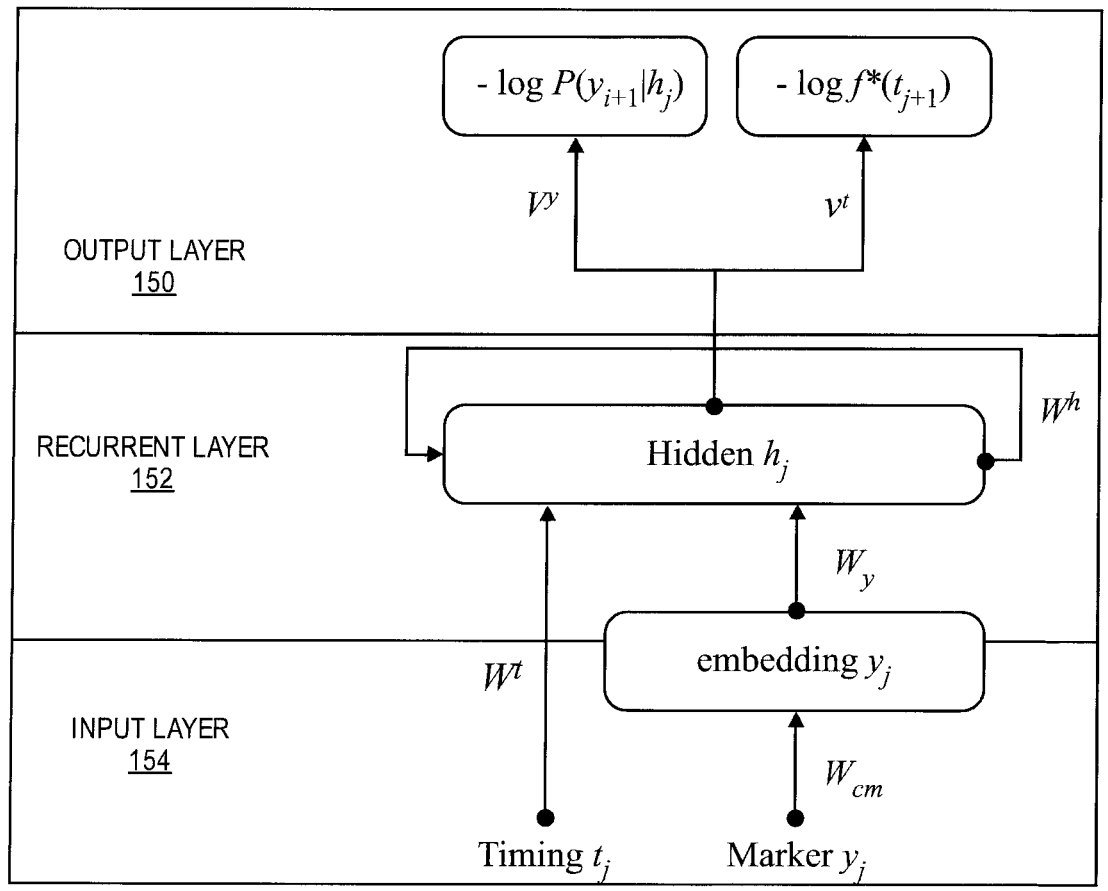
FIG. 1C depicts an example of a neural network, according to various embodiments of the present disclosure.

Given a sequence of events S=$((t_j, y_j)_{j=1}^n)$, the fault time and type prediction module 134 utilizes an RNN as illustrated in FIG. 1C, which includes an input layer 154, a recurrent layer 152, and an output layer 150. The RNN computes a sequence of hidden units $\{h_j\}$ by iterating the input layer 154, the recurrent layer 152, and event prediction and the conditional intensity. The input can include the incident time and type of incident. By maximizing the likelihood function, the loss and converge to get the best parameters can be utilized. These are used to predict the event/incident time duration. The event is incident type and timing refers to the transport vehicle 102 breakdown time. Using this model, the fault time and type prediction module 134 can predict the duration of the fault, defined as the time interval between neighboring successive faults for the transport vehicle 102. Once the duration of the next fault is predicted, it can be added with the previous transport vehicle 102 breakdown time to get the predicted transport vehicle 102 breakdown time for the transport vehicle 102.

The dashboard module 128 is configured to display the prediction/prescriptive information to a user so that it can be viewed and processed easily. As such, a user can schedule and perform maintenance on the components or transport vehicles 102, schedule and install components on particular transport vehicles 102, predict and mitigate faults and incidents, etc.

In embodiments, the monitoring system 104 can be implemented on one or more processing nodes. For example, the monitoring system 104 can be implemented as an application program that is executed on the one or more processing nodes. The processing nodes can be any type of computer systems that are capable of performing the processes and methods described herein and communicating with the components of the transportation system 100, via one or more networks. In embodiments, the one or more networks can include more public and/or private networks, whether wired or wireless.

For example, the processing nodes can include one or more server computers, one or more desktop computers, one or more laptop computer, one or more tablet computers, one or more mobile devices, and the like. In any example, the processing node can include hardware resources (processors, memory, storage, etc.) and software resources (operating systems, application programs, etc.) to perform the process and methods described herein.

Figure 2:
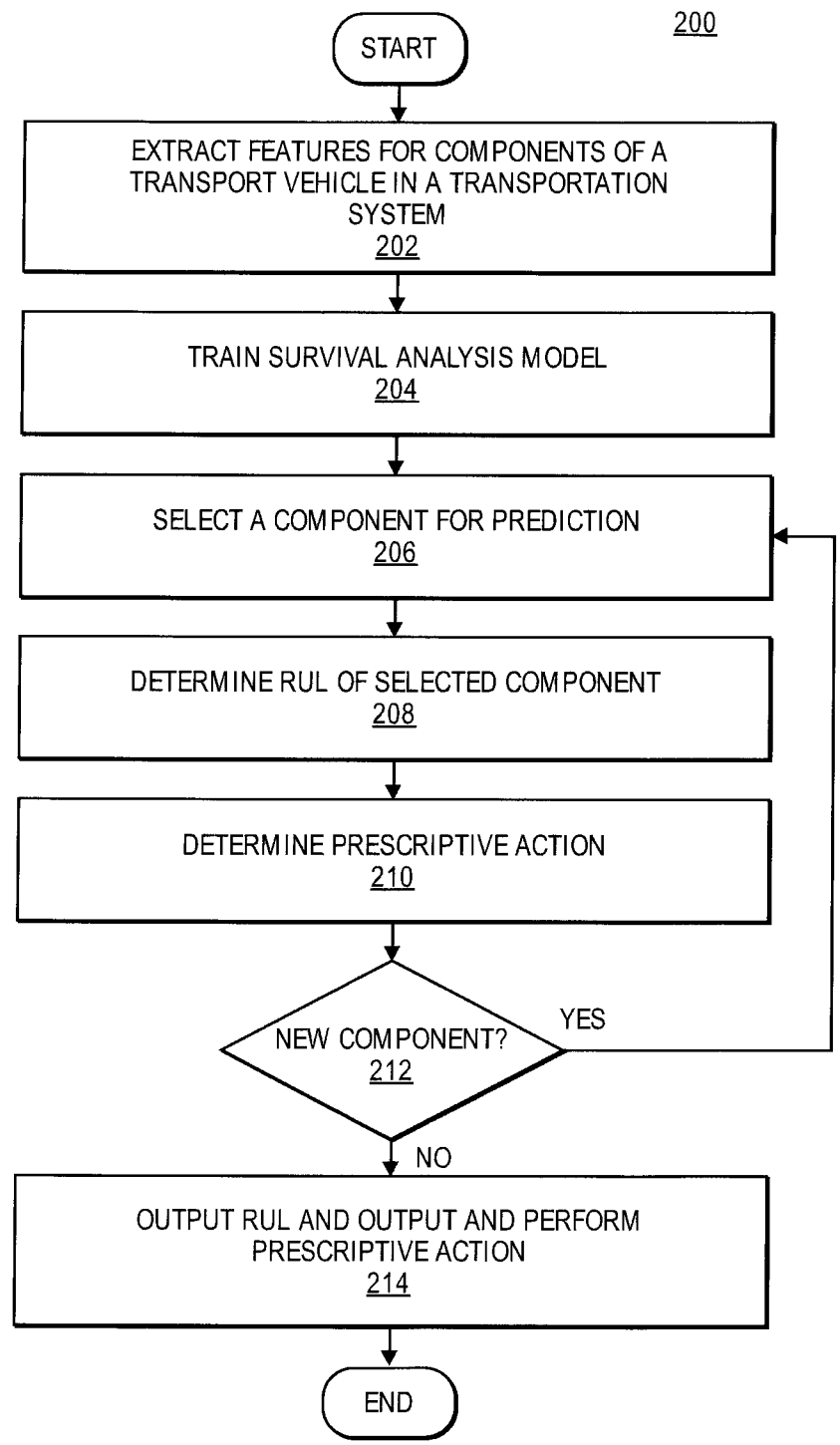
FIG. 2 depicts an exemplary method for predicting RUL of a component of transport vehicle, according to various embodiments of the present disclosure.

FIG. 2 depicts an exemplary method 200 for predicting RUL of a component of transport vehicle. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 202, features are extracted for components of a transport vehicle in a transportation system. For example, the feature extraction module 120 can extract features of components of the transport vehicles 102 in the transportation system 100 from the open database 108 and the proprietary database 110. The features can correspond to a single type of component, e.g., tires, of the transport vehicles 102 or multiple types of components.

The feature extraction module 120 can extract operational data such as the transport vehicles 102 on which the tire was on every day, the route traveled by the transport vehicles 102, the number of bus stops the transport vehicles 102 stopped at, the number of passengers (load) carried by the transport vehicles 102, etc. The feature extraction module 120 can extract operational data such as weather conditions of the region serviced by the transportation system 100 including temperature, precipitation levels, etc., terrain data of the region serviced by the transportation system 100, road conditions serviced by the transportation system 100. The feature extraction module 120 can calculate additional operating data from the open database 108 and the proprietary database 110 for example, by computing elevation profile of routes in which a transport vehicle 102 (and hence the associated components) traveled every day, the weather conditions including temperature, precipitation levels, etc. Optionally, to predict RUL of transport vehicles 102, the feature extraction module 120 can also extract physical features of the components such as tread depth of the tire which would have a direct correlation with the RUL, if available.

In 204, the survival analysis model is trained. For example, the survival analysis module 122 can build and train the survival analysis model using the extracted features.

The survival analysis module 122 is configured to use both standard models such as Cox-PH model and extensions of the Cox-PH models. The survival analysis techniques can utilize data that can be censored, which means for example that some tires are still in use (and hence their observations have been censored until a specific date) while other tires have expired and are awaiting disposition. In addition to the standard COX-PH model for survival analysis, the survival analysis module 122 can utilize a suite of other algorithms which are regularized version of the COX-PH algorithm where the nature of regularization differs. These include regularization with L1 penalty, L2 penalty, L1+L2 penalty, OWL penalty, etc. Each of these penalties (regularization terms) induce a certain structure to the parameters of the model learned and hence are useful for different types of data. In the Cox-PH algorithm, the survival analysis approach is that the hazard for one individual is proportional to the hazard for any other individual, where the proportionality constant is independent of time, as described above in equation 1.

In 206, a component can be selected for prediction. For example, a particular component of a transport vehicle 102 can be selected for prediction. For instance a particular tire installed on a transport vehicle 102 can be selected for prediction.

In 208, the RUL of the selected component can be determined. For example, the RUL prediction module 124 uses the survival analysis module's output to predict the RUL of a component. Once the model has been built and trained (i.e. parameters learned) in the survival analysis module 122, the RUL prediction module 124 uses the built model to predict the RUL of components of the transport vehicles 102, e.g., tires, which are still in use. For instance, in the COX-PH model, the RUL prediction module 124 can compute the survival functions using the learned parameters.

In 210, prescriptive action can be determined. For example, a prescriptive action can include any process or procedure to improve or enhance the RUL of the component. For instance, the prescriptive action can include scheduling or performing maintenance on the component to increase or improve the RUL of the component. Likewise, the prescriptive action can include notifying a user of the RUL through a display or message. Additionally, the prescriptive action can include reassigning the component to a different transport vehicle 102 to improve or enhance the RUL.

In 212, it is determined whether a new component is subject of prediction. If so, the method 200 returns to 206. If not, the method proceeds to 214. In 214, the RUL is output and the prescriptive action is output and performed. For example, the dashboard module 128 can display the prediction/prescriptive information to a user so that it can be viewed and processed easily. As such, a user can schedule and perform maintenance on the components or transport vehicles 102, schedule and install components on particular transport vehicles 102, predict and mitigate faults and incidents, etc.

Figure 3A:
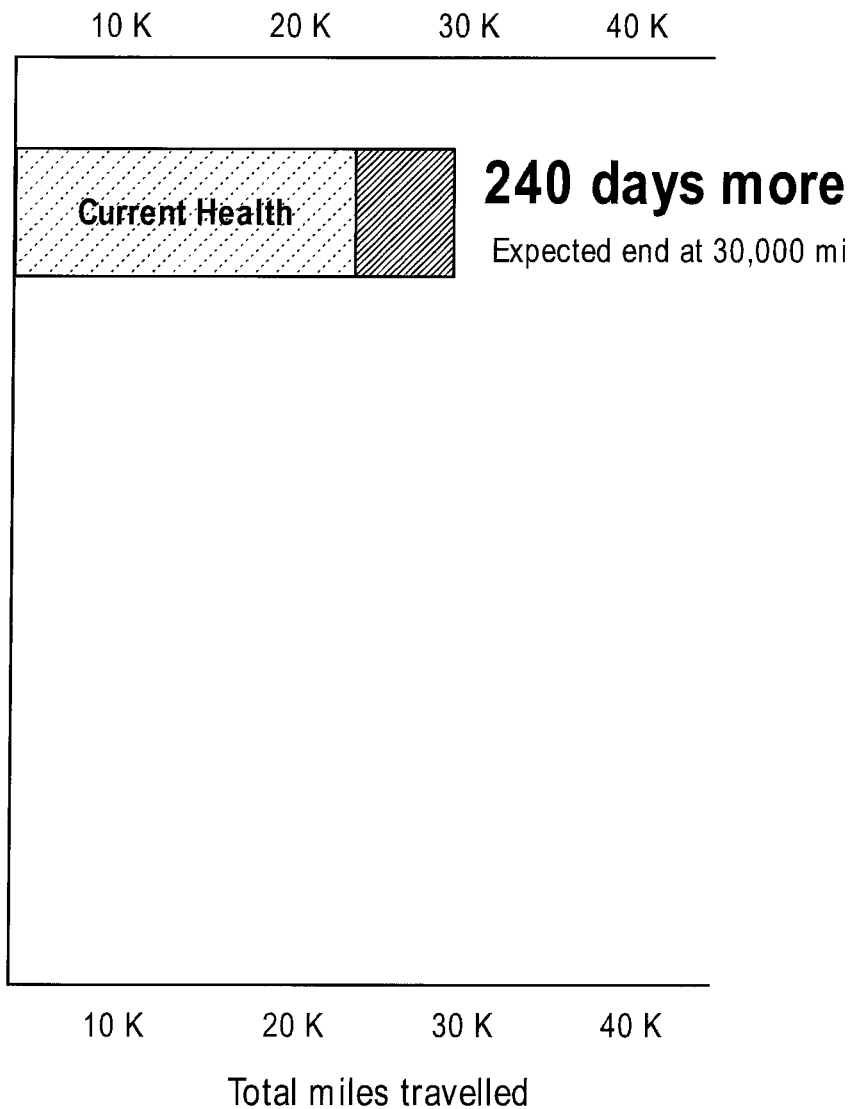
FIGS. 3A and 3B depict examples of interfaces generated during the method for predicting RUL of a component of transport vehicle, according to various embodiment of the present disclosure.
Figure 3B:
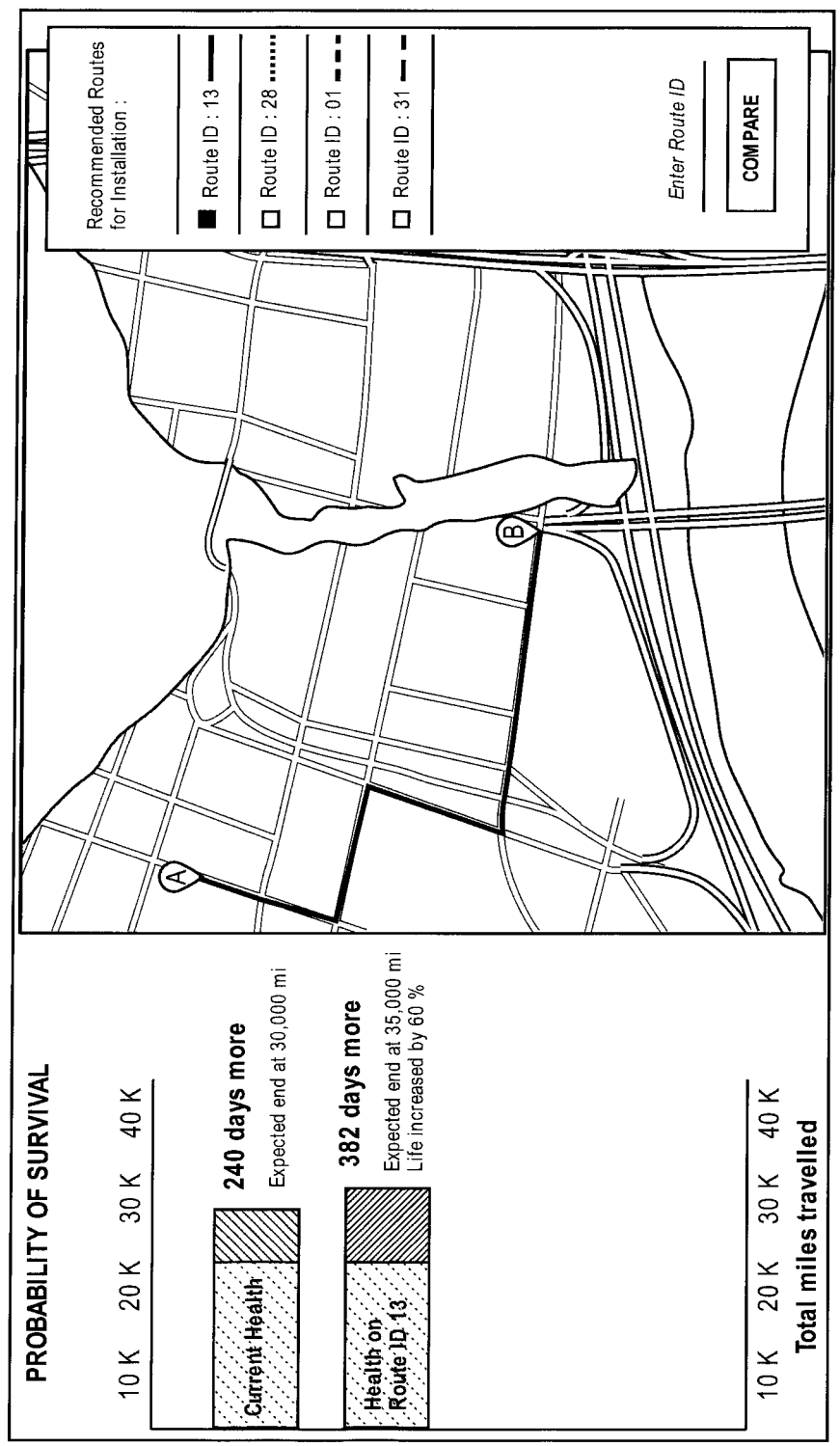

FIGS. 3A and 3B illustrate examples of interfaces for displaying the determined RUL and prescriptive action for a tire. As illustrated in FIG. 3A, the RUL can be displayed in graphical form that indicates the current health of a tire and the expected RUL in terms of mileage and time. As illustrated in FIG. 3B, the RUL of a component can be displayed for different routes taken by a transport vehicle 102.

Figure 4A:
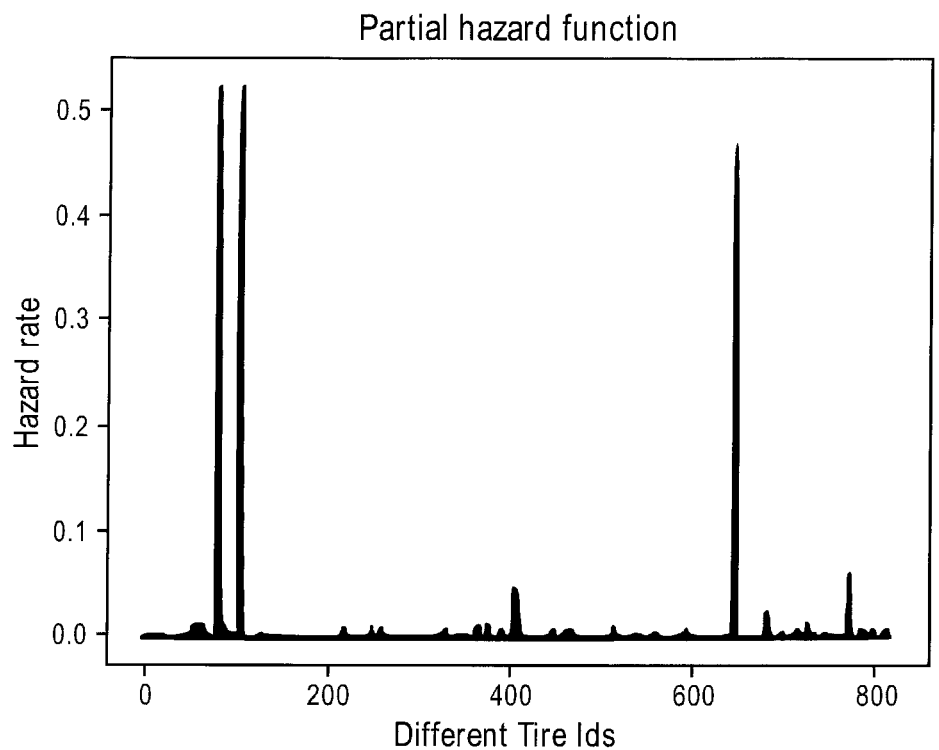
FIGS. 4A-4G depict an example of experimental test results for the method of predicting RUL of a component of a transport vehicle, according to various embodiments of the present disclosure.

FIGS. 4A-4G illustrate experimental test results for the method 200 of predicting RUL of a component of a transport vehicle using a source data set as illustrated in Table 2 (FIG. 4H). The source dataset consists of features responsible for degradation of a tire. A value for each feature was recorded on a timely basis for individual tires. For a given tire, all the features were averaged over the time index. The feature vector corresponding to each tire represents time-averaged values of predictor variables. The life of a tire is viewed in terms of the total number of miles the tire travelled before being eventually taken off from the vehicle. The variable "miles" accumulates the miles travelled by the tire each day. The variable "database status" tracks the status of the tire and is true if it is still running on the vehicle. A value of 1 indicates that the data is censored and vice-versa.

The features include elevation parameters: Elevation_mean, Elevation_std, Elevation_skew & Elevation_kurtosis. These features are basically the statistical measures and their moments obtained from the elevation values of the locations the tire has been to over the course of its journey.

The features also include static parameters: Tire_overall_diameter_mm, Tire_loaded_radius_mm. The effect of rest of the factors varies with the dimension of the tires. Larger tires are more vulnerable to bending, change the center of gravity slightly, and are difficult to turn and don't corner as well.

The features also include dynamic parameters: No_of_bus_stops, No_of_turns, Total_load. The number of transport vehicle stops gives a rough idea about the number of times the transport vehicle stopped and hence the tire faced maximum deceleration. Turning involves a change in velocity and hence the associated centripetal and tangential accelerations are generated which have an impact on the tire. The heavier the load on the transport vehicle is, the more is wearing away of its components.

The features also include external parameters: precipitation_mm, snow_depth_cm, temperature_avg_C. Heat enhances the temperature of the pavements and causes the air inside tire to expand, leading to over inflation. Hot weather results in frequent overheating and pressure development which can result in blowouts. Similarly rain and snow can create a "hydroplaning" situation for the transport vehicle as tire loses its traction on wet surface.

In this example, the dimensions of all the tires in our dataset were the same, and hence removed the static parameters from the final feature vector in our analysis. The features are mean-centered before feeding into the model. The Cox-PH model has been used from the lifelines package for survival analysis in a Python software module. Using the "miles" travelled as survival time and "database_status" as the event, the model is fit on the data with the following estimated coefficients as illustrated in Table 2 (FIG. 4H).

Figure 4B:
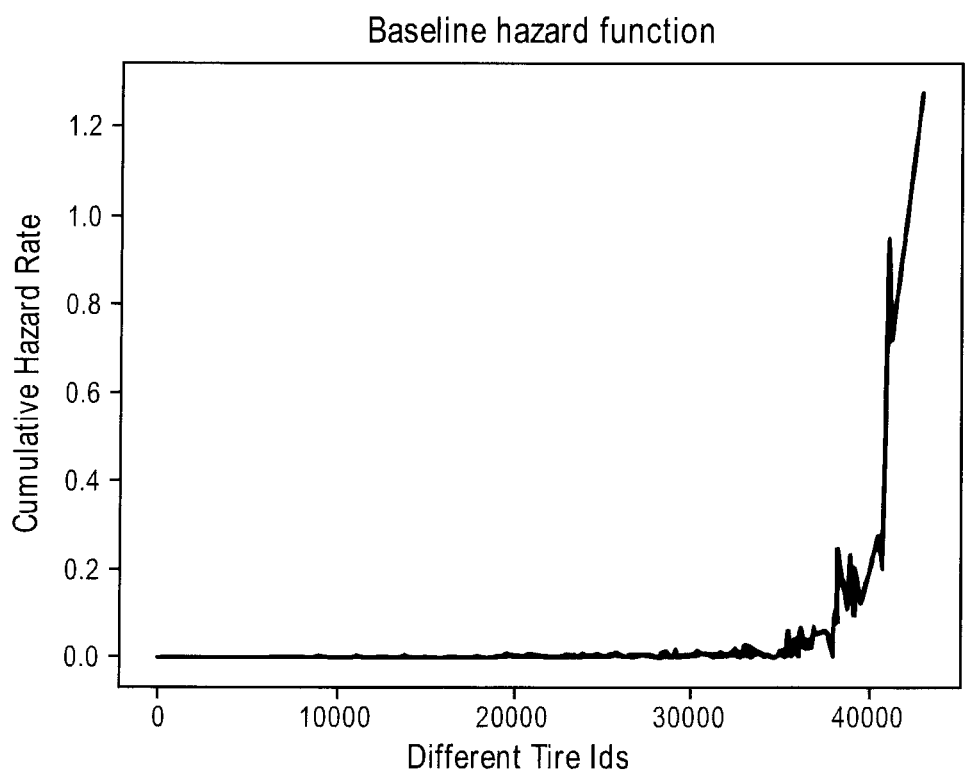

The partial hazard function gives a relative measure of how different entities are at risk of failure with respect to the rest of the candidates in the set. FIG. 4A depicts the tendency of failure among the 821 tires on which training was done. The baseline hazard function gives the instantaneous potential per unit time for the failure event to occur, given that the tire has survived up to certain miles, as illustrated in FIG. 4B. As can be seen in the plot, beyond 40,000 miles the tendency to fail drastically increases for the tires available in the set, which gives a rough idea about the life of a set of tires as a whole.

Figure 4C:
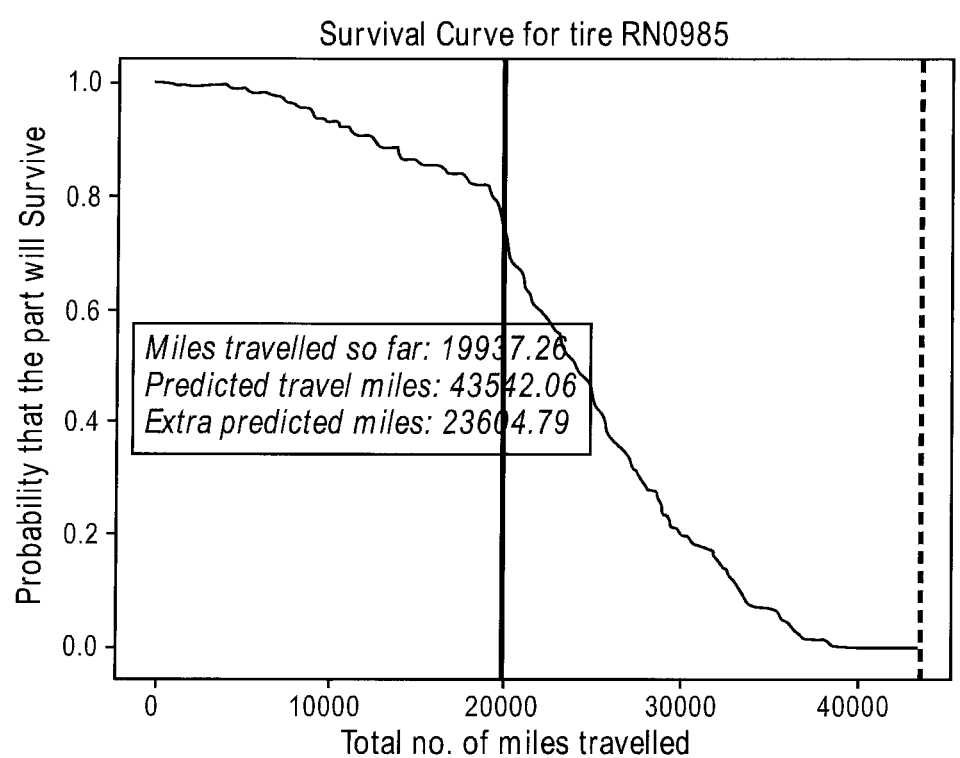
Figure 4D:
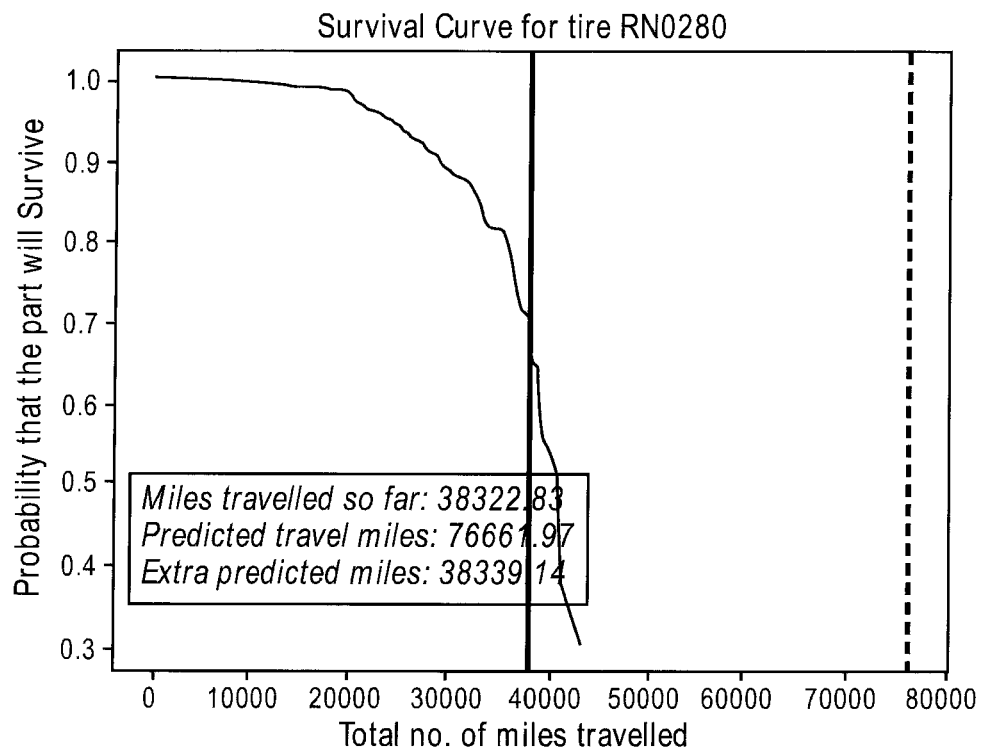
Figure 4E:
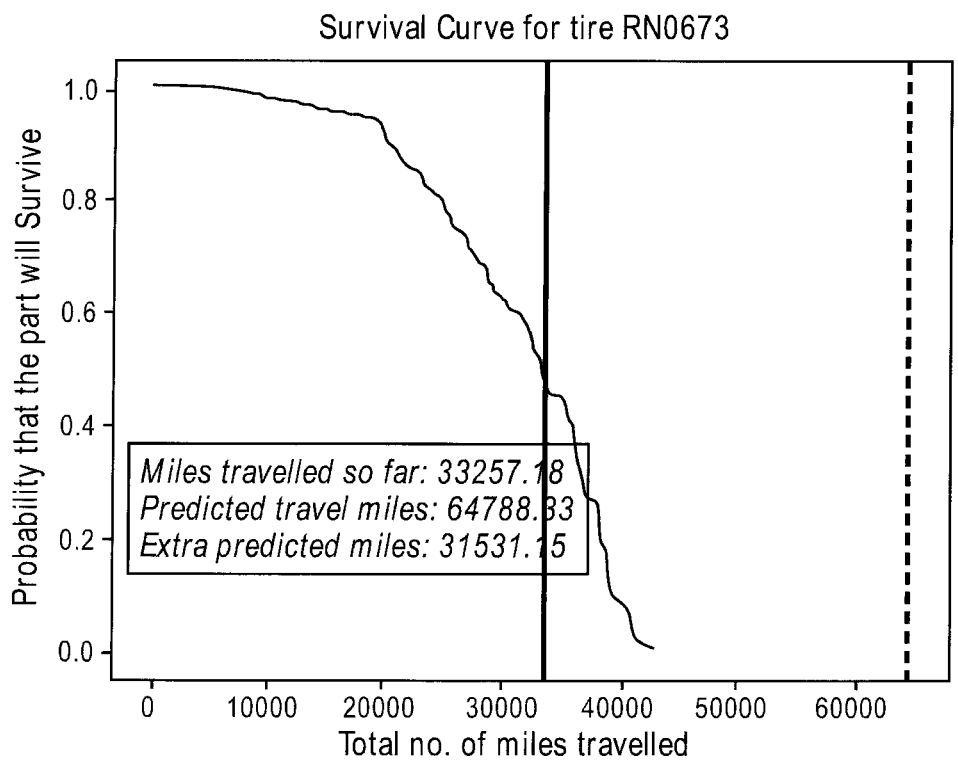
Figure 4F:
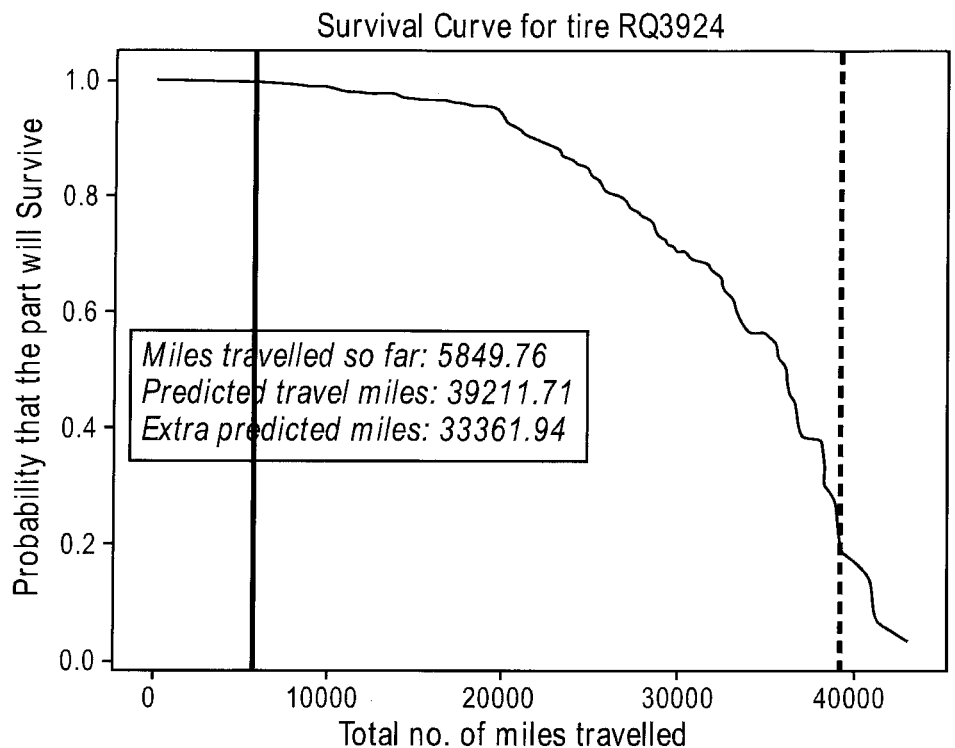
Figure 4G:
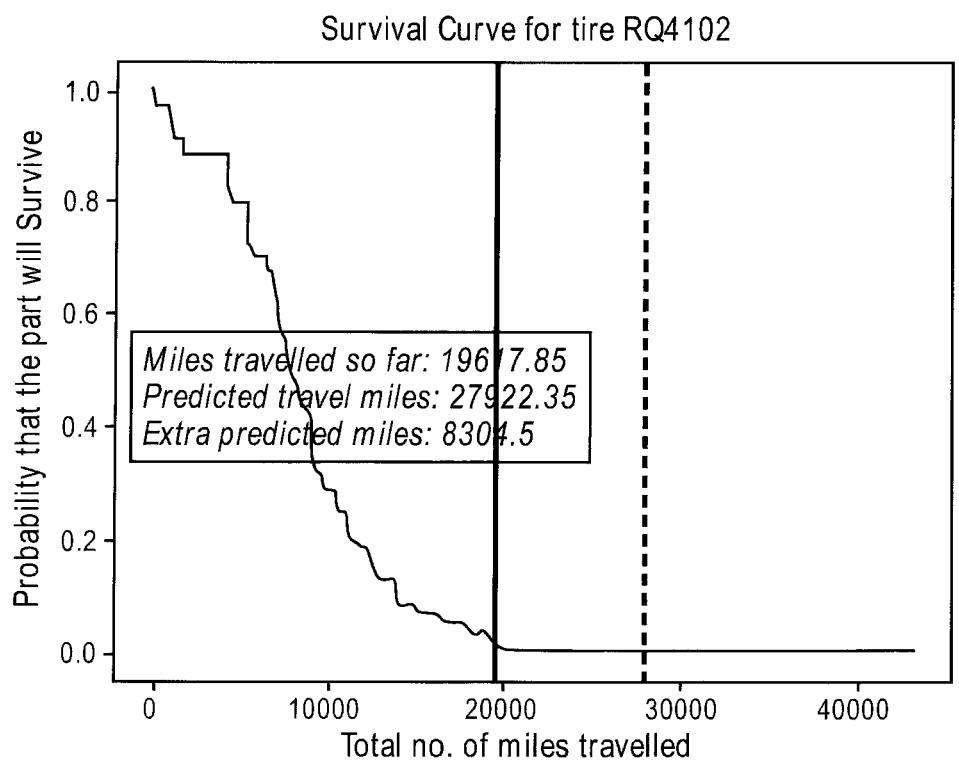

The entire data set was subdivided into two subsets of running and failed tires. The running subset contained all the tires which were currently on a transport vehicle or equivalently had the 'database_status' as 1. This set represented the censored data. The other set had the tires declared as failed. The predictions were made on the first set of tires which were currently running then. FIG. 4C illustrates a typical output of the RUL prediction module 124. The plot signifies the probability of the component surviving as it travels more and more miles. This data can be seen as a trend of the degradation in the life of the tire. The y-axis corresponds to the probability of the tire surviving and the x-axis shows the total miles traveled by the tire. The vertical solid line depicts the current state of the tire, i.e., how many miles it has traveled currently. The dotted vertical line is the prediction output, the upper limit of miles which the tire can travel before failure. This is not a hard threshold but rather a prediction in probabilistic sense. The same information is presented in actual figures too. The "Predicted travel miles" is the upper limit on the total miles that the algorithm suggests for the tire. The "Extra predicted miles" are the more miles the tire can travel from its current state before ending into a potential failure. The same result for other tires are also illustrated FIGS. 4D-4G.

Figure 5:
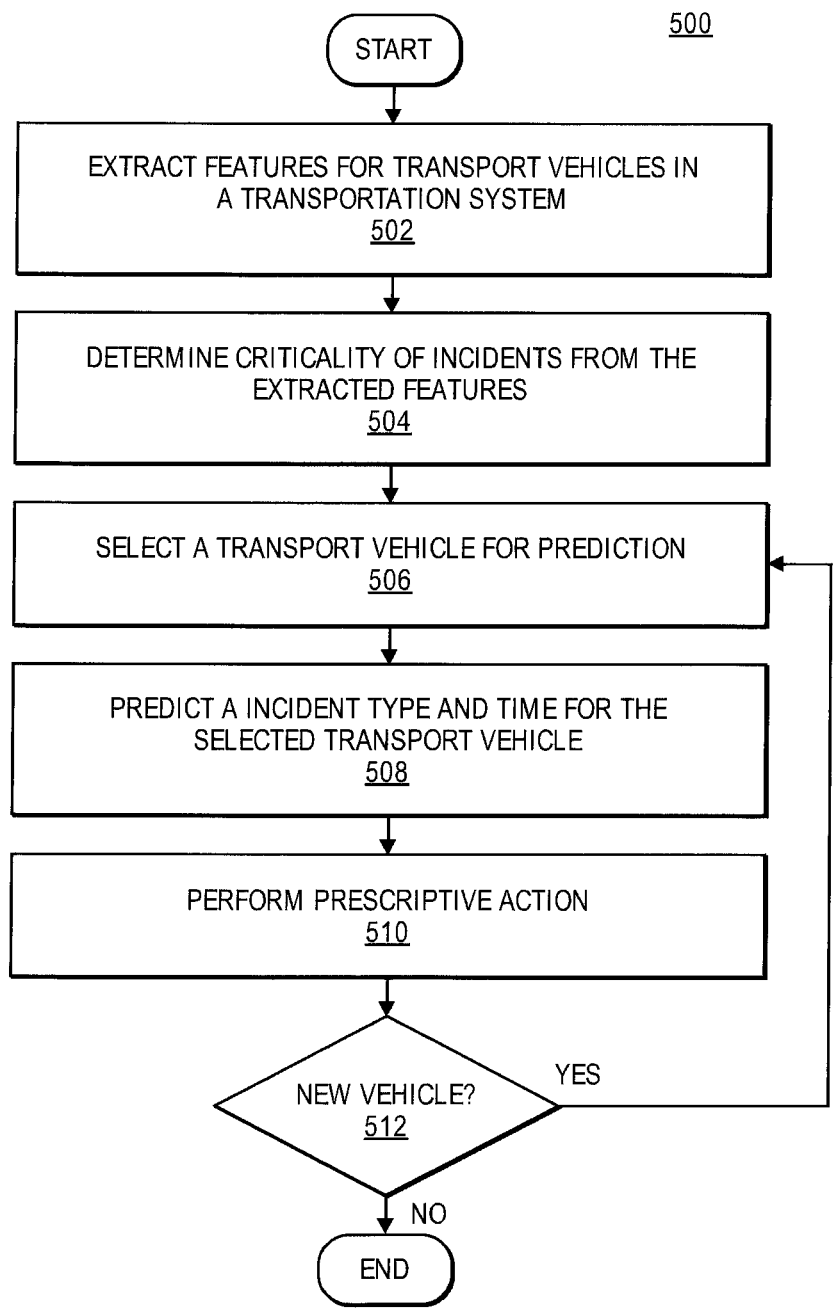
FIG. 5 depicts an exemplary method for predicting incidents for a transport vehicle, according to various embodiments of the present disclosure.

FIG. 5 depicts an exemplary method 500 for predicting incidents for a transport vehicle. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 502, features are extracted for transport vehicles in a transportation system. For example, the feature extraction module 120 can extract features of the transport vehicles 102 in the transportation system 100 from the open database 108 and the proprietary database 110. The features can correspond to a historical incidents, e.g., faults, accidents, etc., for the transport vehicles 102.

The feature extraction module 120 can extract operational data such as the time, location, type, duration of incidents for transport vehicles 102. The feature extraction module 120 can extract operational data such as weather conditions of the region serviced by the transportation system 100 including temperature, precipitation levels, etc., terrain data of the region serviced by the transportation system 100, road conditions serviced by the transportation system 100.

In 204, the criticality of incidents are determined from the extract features. For example, the fault criticality analysis module 128 can be configured to determine a criticality of different faults, which can occur to the transport vehicles 102. The results can be fed to the prescriptive module 126 and the fault criticality prediction module 132. The fault criticality can be classified into low, medium or high based on the tolerable limit of the transport vehicle 102 leading to breakdown. To perform this, the factors affecting incidents like vehicle specific factors, external factors, road geometric factors, weather conditions etc. can be extracted from the open database 108 and the propriety database 110. The vehicle breakdown data for each transport vehicle 102 and route can be aggregate to a week level. Thus, prediction can be performed for the next week's data using the historical data for that transport vehicle 102. The fault criticality analysis module 128 can utilize involves two processes: feature extraction and classification as described above.

In 506, a transport vehicle can be selected for prediction. For example, a particular transport vehicle 102 can be selected for prediction. In 508, an incident type and time can be predicted for the selected transport vehicle.

For example, the fault time and type analysis module 130 is configured to extract data to predict fault criticality, time, and type using the fault criticality prediction module 132 and the fault time and type prediction module 134. The fault time and type analysis module 130 can utilize a marked temporal point process, which is mathematical tool to model the latent mechanisms governing the observed random event patterns along time. Since the occurrence of an event may be triggered by what happened in the past, specify models for the timing of the next event given what we have already known can be determined.

To handle deciding which parametric form to use without prior knowledge, a unified model capable of modeling a general nonlinear dependency over the history of both the event timing and the marker information is proposed. The fault time and type prediction module 134 can utilize a RNN to model the nonlinear dependency over both of the markers and the timings from past events. For instance, the fault time and type prediction module 134 utilizes an RNN as illustrated in FIG. 1C, which includes an input layer 154, a recurrent layer 152, and an output layer 150. The RNN computes a sequence of hidden units $\{h_j\}$ by iterating the input layer 154, the recurrent layer 152, and event prediction and the conditional intensity. The input can include the incident time and type of incident. By maximizing the likelihood function, the loss and converge to get the best parameters can be utilized. These are used to predict the event/incident time duration. The event is incident type and timing refers to the transport vehicle 102 breakdown time. Using this model, the fault time and type prediction module 134 can predict the duration of the fault, defined as the time interval between neighboring successive faults for the transport vehicle 102. Once the duration of the next fault is predicted, it can be added with the previous transport vehicle 102 breakdown time to get the predicted transport vehicle 102 breakdown time for the transport vehicle 102.

In 510, prescriptive action can be performed. For example, a prescriptive action can include any process or procedure to prevent or mitigate an incident. For instance, the prescriptive action can include scheduling or performing maintenance on the transport vehicle 102. Likewise, the prescriptive action can include notifying a user of through a display or message.

For example, the dashboard module 128 can display the prediction/prescriptive information to a user so that it can be viewed and processed easily. As such, a user can schedule and perform maintenance on the components or transport vehicles 102, schedule and install components on particular transport vehicles 102, predict and mitigate faults and incidents, etc.

In 512, it is determined whether a new transport vehicle is subject of prediction. If so, the method 500 returns to 506. If not, the method proceeds ends.

Figure 6A:
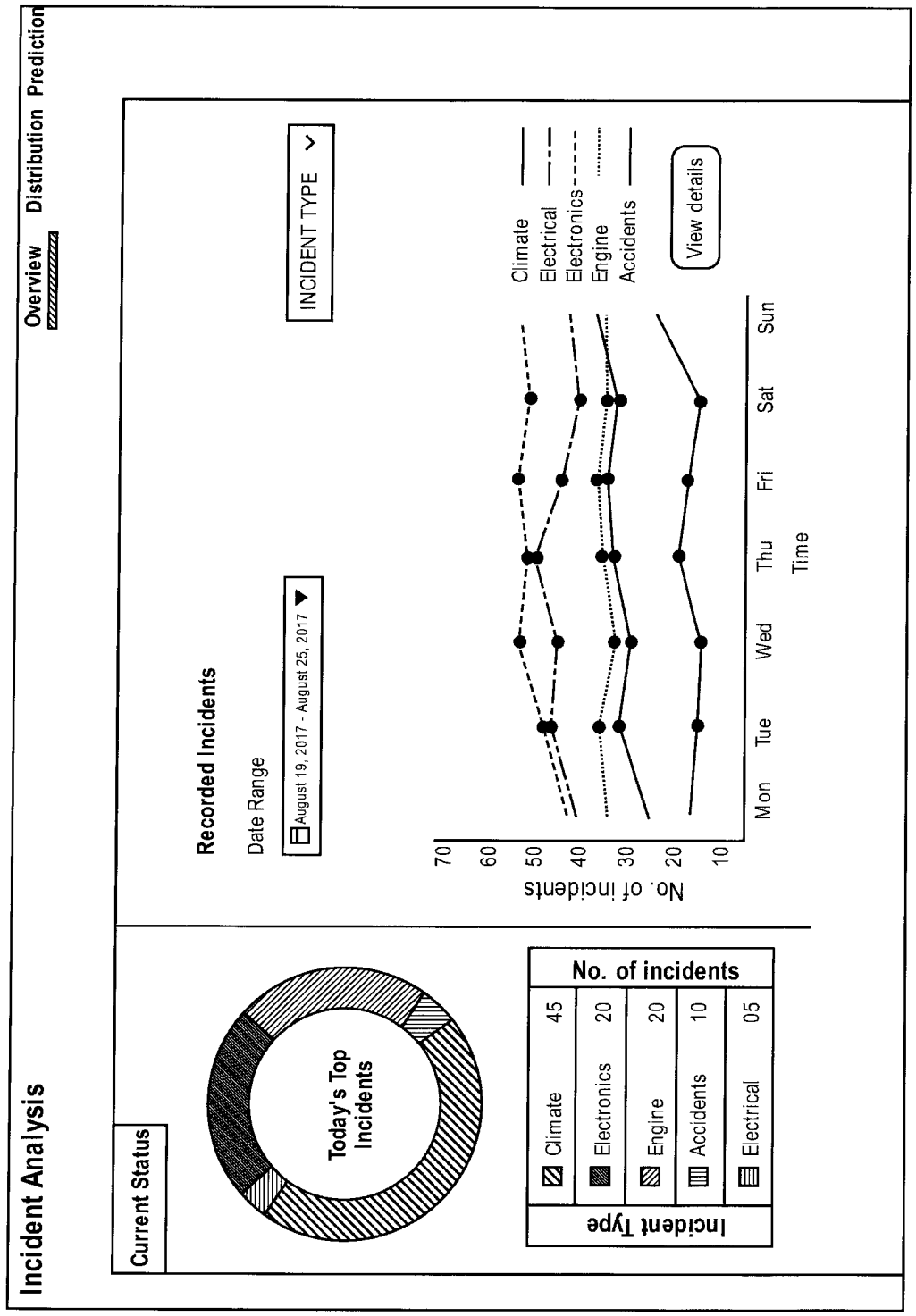

FIGS. 6A-6D illustrate various interfaces for displaying incidents using experimental test results for the method 500 of predicting incidents and faults of a transport vehicle using a source data set. As illustrated in FIG. 6A, the incidents from a given time period can be displayed graphically in several forms in which the incidents can be broken into different types. The left side shows the current status of the incidents. It shows the total number of incidents happened today. The donut graph shows the distribution of the total incidents across incident types. The most 5 frequent incident types are shown in different colors. The right side shows the historical incident details. On selecting a date range, the frequency distribution of each incident type is shown across various days of a week (Sunday-Saturday) will be displayed. Without selection, last week data will be shown by default across incident types.

FIG. 6B illustrates another interface for displaying incidents from the source data set in which the data is displayed in a table including relevant information. As illustrated, on selecting a date range, the view details button displays the finer technical details of the incident. Important details like incident log id, type of incident, description of incident, date of incident, time of incident, operator, route, block and vehicle information will be displayed. This information can be downloaded in any form. These finer details will help to understand in depth about the factors related to the incident. To generate the interface, the vehicle data is preprocessed and passed on to the dashboard module 136. Once the user selects the filters, the input is passed on to the temporary table. This filters the required data and displays in the dashboard module 136.

Figure 6C:
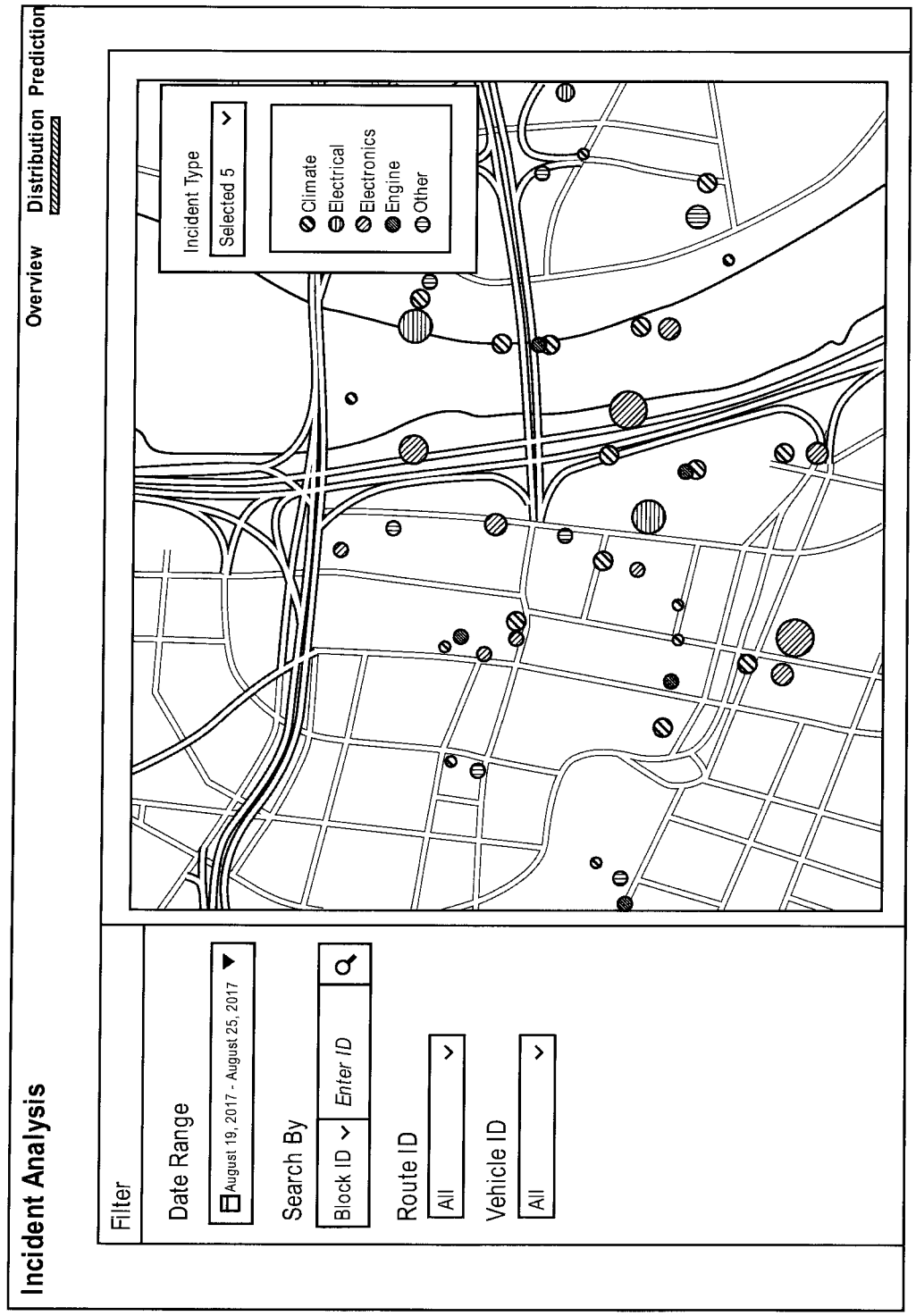

FIG. 6C illustrates another interface for displaying the incidents overlaid on a geographical map. On right side, selecting a range of dates, the spatial distribution of the incidents is shown. There is a filter available for selecting incident types. By default, all the incident types will be shown as points in same color. On selecting the type of incident, each will be denoted by different color. Only top 5 frequent incidents types will be shown by default. On the left side, user has the flexibility to search for a block/route/ vehicle given a date range. The first available filter will be the primary filter. Based on that selection, the remaining secondary filters will be shown. These primary/secondary filters help in narrowing down the search and try to find pattern across different route/blocks. To generate this data, transport vehicle data is processed using the latitude and longitude for each incident. If exact latitude/longitude is not available, the nearest area/location of the incident will be obtained by clustering or nearest neighbor machine learning approach.

Figure 6D:
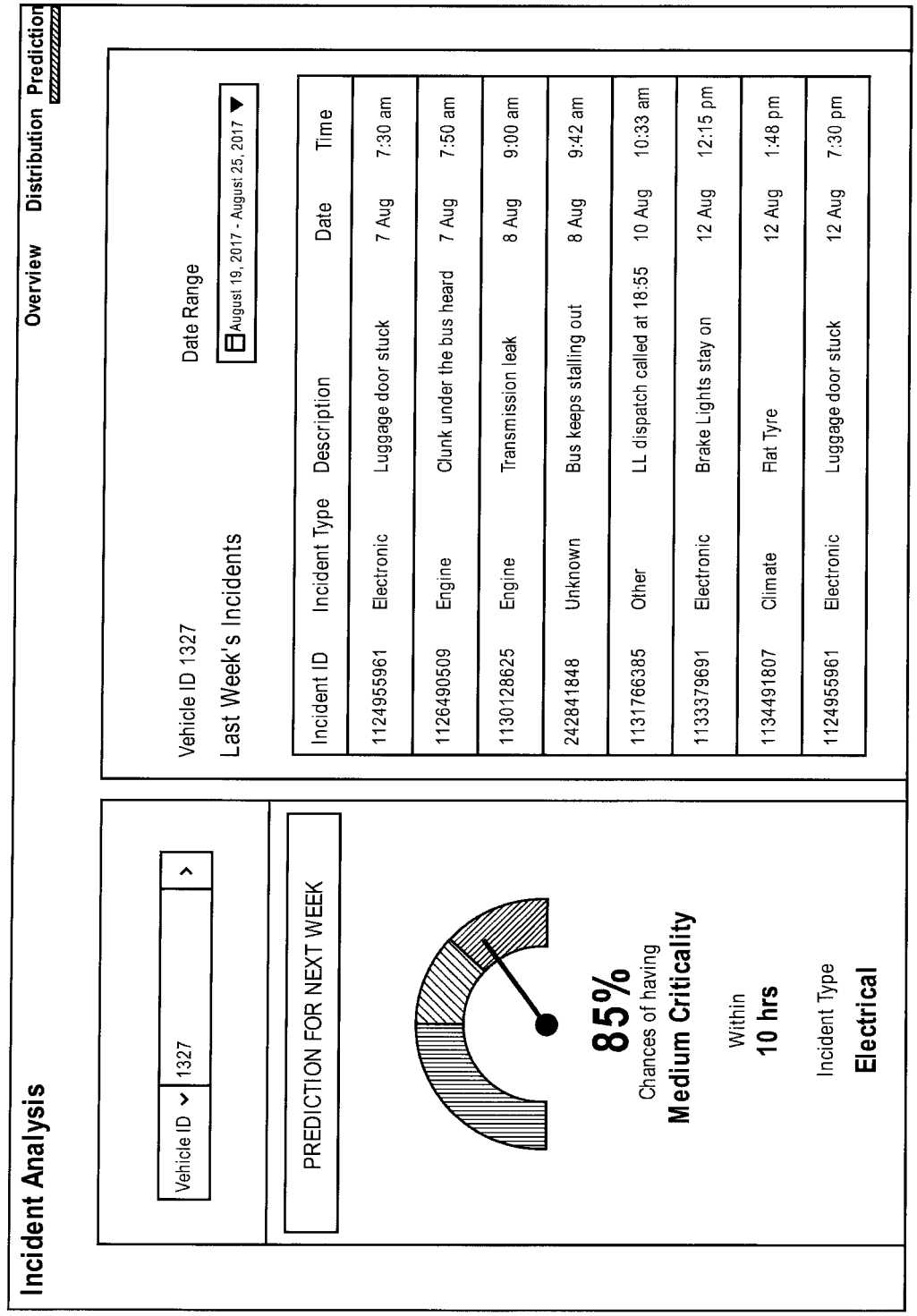

FIG. 6D illustrates another interface for displaying the incidents. As illustrated, on the left side of the interface, a user can select either vehicle number or route number. On selecting vehicle/route, the prediction values with criticality, time and type of incident will be displayed for next week. The right side shows the history of the last week's faults for the chosen vehicle/route. This helps the user to compare with the last week and next week prediction for incident analysis. By default always the next week's prediction will be calculated irrespective of date range chosen on right side.

For the method 500 used on the experimental data illustrated in FIGS. 6A-6D, each transport vehicle's data was preprocessed and averaged for a week's level. Each of the features illustrated in in the Table 1 above was aggregated to a week's level. Apart from this, the auto regressive integrated moving average (ARIMA) was generated for relevant features. The ARIMA are done to determine the past week's influence and included it as a feature set. To reduce the dimensions, principal components were considered using principal component analysis (PCA) model.

The processed features were of 60 dimensions for each transport vehicle. The processed features were passed on as input to each of classifier of the fault criticality analysis module 128 (fine tuning each model type mentioned above using hyper-parameters). The labels were marked as high critical if there at least one high critical issue. If the number of issues with medium/low criticality more than 15, they were labeled as medium critical issue. The number of issues with medium/low criticality is in the range of 2-15, they were labeled as low criticality. The definition on high, low, medium criticality can be set by a user. As a default, the method generally buckets the frequency of criticality to define the label for train data. The total number of training data were 12826 with 1282 data for testing. Cross validation was performed to ensure the reduction of over-fitting. The final results were shown for the gradient boosting classifier which performs best. The prediction accuracy for the high, medium and low criticality is given as: High Accuracy— 42%, Medium Accuracy—40%, Low Accuracy—68%. Using this, a user can plan the operation of the contingency transport vehicles or improve operational excellence for revenue trips.

In the experimental results, using the method 500, each transport vehicle's incident data is considered as sequence of events. The transport vehicle breakdown time and incident type will be the pair of events passed on as input to the RNN. In experimental data, the vehicle had 120 incident occurrences at different time belonging to different incident types such as transit center issue, gauge issue, electronics issue etc.

The transport vehicle breakdown time data was preprocessed to normalize it into unit of hours and event type was mapped to an integer value. These inputs were fed into the RNN model fine tune with various hyper-parameters like iterations, learning rate, epochs etc. Table 3 shows the parameter values for the experimental data.

TABLE 3

| | |
|---|---|
| Hidden unit | 64 |
| Input unit for embedding | 64 |
| Back propagation by time | 6 |
| Learning rate | 0.0001 |
| Iteration | 50000 |

Fine tuning the model yields: Root mean square error for vehicle breakdown duration estimation as 0.0043, Root mean square error for incident type is 0.33.

Using the results, a user can plan for better recovery and planning for maintenance systems.

Figure 7:
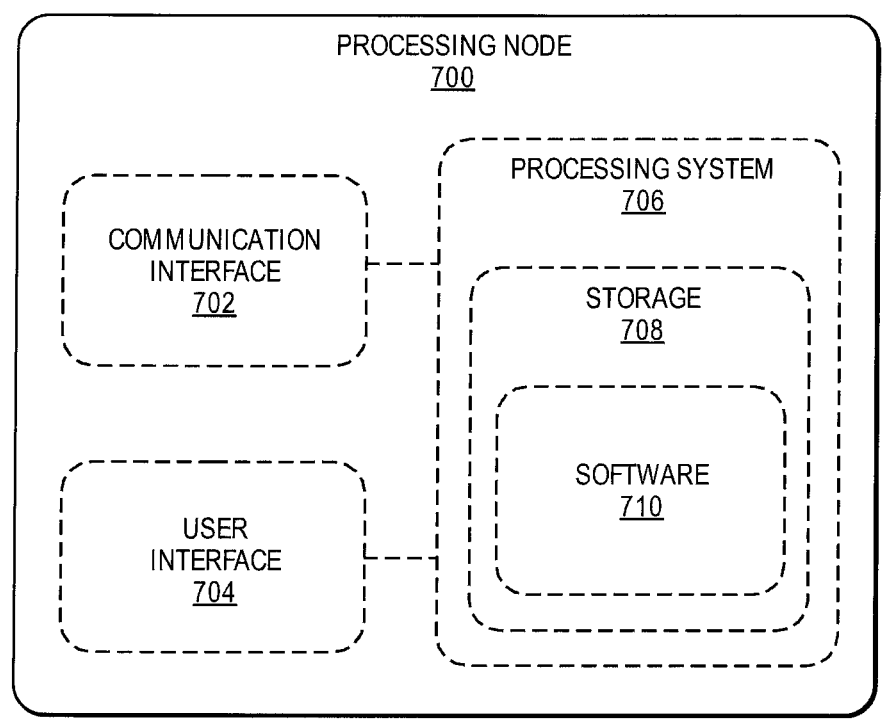
FIG. 7 depicts an exemplary processing node for predicting RUL of a component of a transport vehicle and predicting faults and incidents in the transport vehicle, according to various embodiments of the present disclosure.

FIG. 7 depicts an exemplary processing node 700 comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 can include a disk drive, flash drive, data storage circuitry, or some other memory apparatus. For example, storage 708 can include a buffer. Software 710 can include computer programs, firmware, or some other form of machine-readable instructions, including an operating system, utilities, drivers, network interfaces, applications, or some other type of software. For example, software 710 can include the monitoring system 104 described above. Processing system 706 can include a microprocessor and other circuitry to retrieve and execute software 710 from storage 708. Processing node 700 can further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing preventive maintenance on a transport vehicle in a transportation system, the method comprising:
    extracting features for previous incidents that have occurred to a plurality of transport vehicles in the transportation system;
    determining a criticality of types of incidents based on the features extracted;
    predicting, based on the criticality of types of incidents and the features extracted, details of at least one future incident for a first transport vehicle from the plurality of transport vehicles, wherein the details include a predicted type of the at least one future incident, a predicted time of the at least one future incident, and a predicted criticality of the at least one future incident;
    predicting a breakdown time for the first transport vehicle; and
    performing a prescriptive action for the first transport vehicle to mitigate the at least one future incident in the first transport vehicle,
    wherein the types of incidents include failure of a component of the plurality of transport vehicles and an accident involving one of the plurality of transport vehicles.

2. The method of claim 1, wherein the prescriptive action comprises displaying in a graphical user interface the details of the at least one future incident and possible solutions for addressing the at least one future incident.

3. The method of claim 1, wherein the prescriptive action comprises performing maintenance on the first transport vehicle to mitigate the at least one future incident.

4. The method of claim 1, wherein the prescriptive action comprises rerouting the first transport vehicle to avoid the at least one future incident.

5. The method of claim 1, wherein determining the criticality of the types of incidents comprises:
    classifying the types of incidents based on the features extracted.

6. The method of claim 1, wherein predicting the details of at least one future incident comprises:
    applying the features extracted to a recurrent neural network.

7. A method for extending usage of components of a transport vehicle in a transportation system, the method comprising:
    extracting features for components of a plurality of components of transport vehicles in the transportation system, the features comprising operating conditions of the components;
    selecting a first component from the plurality of components for prediction of remaining useful life of the first component;
    determining the remaining useful life of the first component, wherein the remaining useful life is determined by applying the features to a survival analysis model; and
    performing a prescriptive action to extend the remaining useful life of the first component,
    wherein the prescriptive action includes at least a selected route to be travelled by the transport vehicle.

8. The method of claim 7, the method further comprising:
    training the survival analysis model using the features extracted for the plurality of components.

9. The method of claim 7, wherein the prescriptive action comprises displaying in a graphical user interface the remaining useful life of the first component and possible solutions for improving the remaining useful life.

10. The method of claim 7, wherein the prescriptive action comprises performing maintenance on the first component.

11. The method of claim 7, wherein the prescriptive action comprises installing the first component on a new transport vehicle to improve the remaining useful life.

12. The method of claim 7, wherein the operating conditions comprise weather conditions in which the first component is operating and geographical conditions in which the first component is operating.

13. The method of claim 7, wherein the survival analysis model is a COX model.

14. A processing node for extending usage of components of a transport vehicle in a transportation system, the processing node being configured to perform operations comprising:
    extracting features for components of a plurality of components of transport vehicles in the transportation system, the features comprising the operating conditions of the components;
    selecting a first component from the plurality of components for prediction of remaining useful life of the first component;
    determining the remaining useful life of the first component, wherein the remaining useful life is determined by applying the features to a survival analysis model; and
    performing a prescriptive action to extend the remaining useful life of the first component,
    wherein the prescriptive action includes at least a selected route to be travelled by the transport vehicle.

15. The processing node of claim 14, the operations further comprising:
    training the survival analysis model using the features extracted for the plurality of components.

16. The processing node of claim 14, wherein the prescriptive action comprises displaying in a graphical user interface the remaining useful life of the first component and possible solutions for improving the remaining useful life.

17. The processing node of claim 14, wherein the prescriptive action comprises performing maintenance on the first component.

18. The processing node of claim 14, wherein the prescriptive action comprises installing the first component on a new transport vehicle to improve the remaining useful life.

19. The processing node of claim 14, wherein the operating conditions comprise weather conditions in which the first component is operating and geographical conditions in which the first component is operating.

* * * * *